May 27, 1958   O. SPETHMANN   2,836,043
LIGHTING TORCHES
Filed Dec. 6, 1954   2 Sheets-Sheet 1
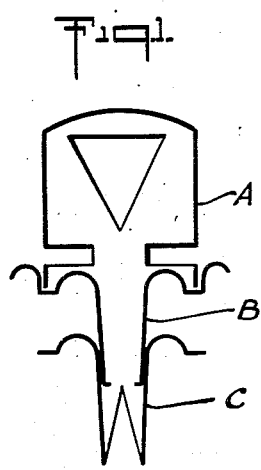
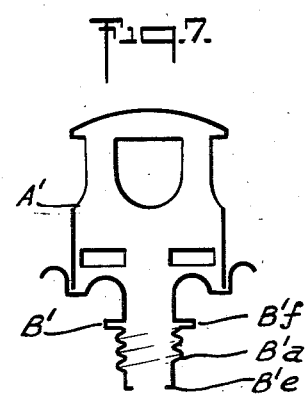
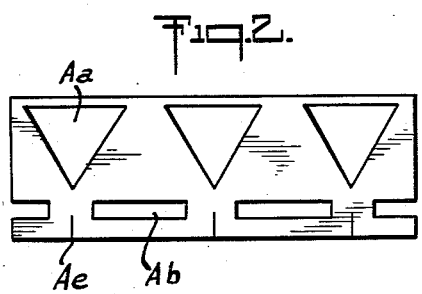
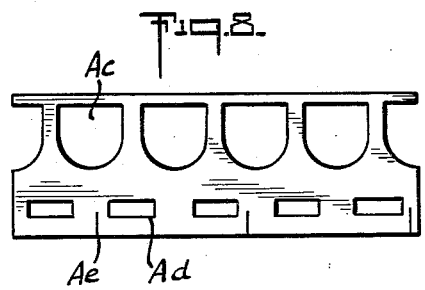
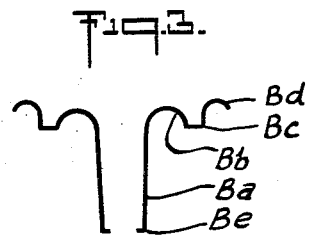
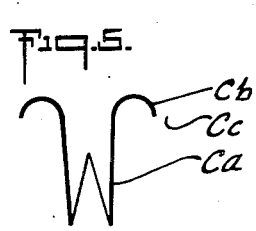
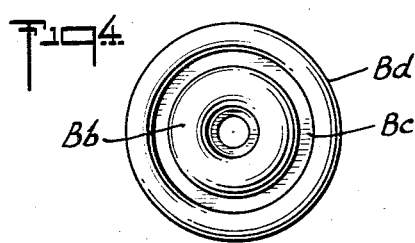
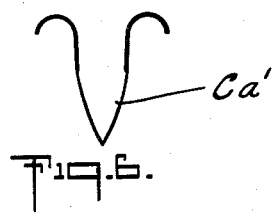
INVENTOR
OTTO SPETHMANN
BY
ATTORNEY May 27, 1958     O. SPETHMANN     2,836,043
LIGHTING TORCHES
Filed Dec. 6, 1954                      2 Sheets—Sheet 2
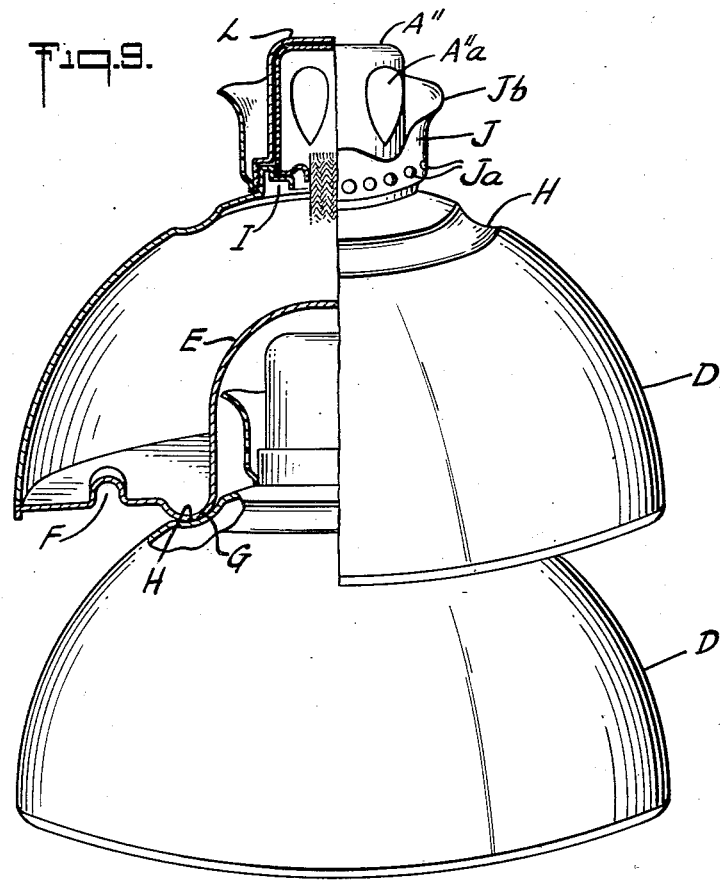
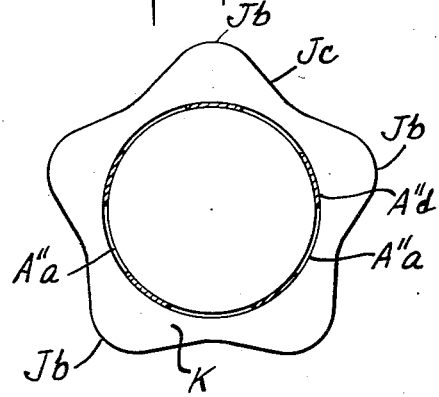
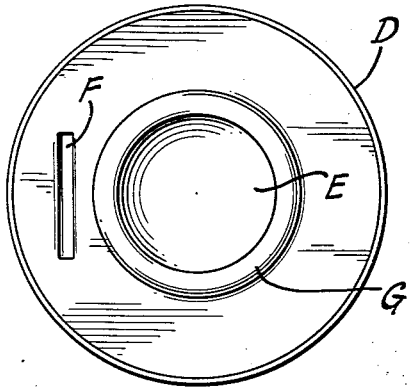
INVENTOR
OTTO SPETHMANN
BY
ATTORNEY

United States Patent Office 2,836,043
Patented May 27, 1958

2,836,043

LIGHTING TORCHES

Otto Spethmann, Hamburg-Altona, Germany

Application December 6, 1954, Serial No. 473,328

10 Claims. (Cl. 67—55)

The present invention relates to light torches of the outdoor type operated by liquid fuel for use as lighting, storm, signal or warning lamps.

In lamps of the general type described, a flame fed from a fuel reservoir through a wick inside a container, burns to emit a warning or signal light.

One object of the present invention is to provide a new and improved lamp of the general type described, designed to prevent extinguishment of the flame due to wind even of the most severe intensity and to maintain a bright, freely burning light, even under the most severe weather conditions.

Another object is to provide a lamp of the general type described, mechanically constructed for safe operation and universal application with minimum of care and of attendance for long intervals.

The lamp of the present invention can be operated with Diesel fuel, gas oils or petroleum and produces a freely burning flame which adjusts itself as to size, brightness and direction according to the conditions of the wind. Because of the distinctive design of the lamp to be described, the extinguishment of the flame is not possible, either by constant or gusty winds or by rain. Variations in the intensity of the warning light produced by weather conditions are advantageous from a purely physiological standpoint, since a light varying in brightness, even though low in intensity, excites and draws greater attention than a light of constant brightness, even though higher in intensity.

Various other objects and advantages of the present invention are apparent from the following description and from the accompanying drawings, in which—

Fig. 1 is a diagrammatic sectional side elevation of a combustion or burner unit including a fuel reservoir opener, which forms part of a warning torch and which constitutes one embodiment of the present invention;

Fig. 2 shows diagrammatically the hood part of the burner unit in the embodiment of Fig. 1, in unwound or developed form;

Fig. 3 shows diagrammatically in sectional side elevation, the wick and hood holder of the burner unit indicated in Fig. 1;

Fig. 4 shows diagrammatically in bottom plan view, the wick and hood holder of the burner unit indicated in Fig. 1;

Fig. 5 shows diagrammatically in sectional side elevation, the reservoir opener for puncturing the fuel reservoir and for attaching the burner unit to the fuel reservoir in the embodiment of Fig. 1;

Fig. 6 is the diagrammatic sectional side elevation of the reservoir opener for attaching the burner unit to the fuel reservoir in the embodiment of Fig. 5 but shows said opener turned 90° around its longitudinal axis from the position shown in Fig. 5;

Fig. 7 is a diagrammatic sectional side elevation of the burner unit of a warning torch, constituting another embodiment of the present invention and having a part for threaded connection to a fuel reservoir;

Fig. 8 shows diagrammatically the hood part of the burner unit in the embodiment of Fig. 7, in unwound or developed form;

Fig. 9 is a side elevational perspective somewhat diagrammatic of a pair of warning torches shown stacked and constituting another embodiment of the invention;

Fig. 10 is a horizontal sectional view somewhat diagrammatic of the hood and of the storm collar or guard shown in their proper angular relationship about their common centers in the embodiment of Fig. 9; and Fig. 11 is a bottom plan view somewhat diagrammatic of the torch shown in Fig. 9.

The torch illustrated in Figs. 1–6 has a fuel reservoir (not shown) adapted to contain diesel fuel, gas oil or petroleum and having the usual wick (not shown) therein. The burner unit in connection with this reservoir comprises in general a storm hood A, a wick and storm hood holder B having a depending slip-in tube extension, and a reservoir opener C for puncturing the reservoir tank or can and for connecting the burner unit to the said tank. The storm hood A into which the end of the wick extends serves as protection for the wick flame and prevents said flame from being extinguished by steady winds, by suddenly occurring gusts of wind and by rain. This storm hood A is in the form of an inverted metal cylindrical cup, open at the bottom and closed at the top by an arched roof. The cylindrical skirt of the hood A is provided with a plurality of openings $Ab$ to admit combustion air into the hood, and a corresponding number of openings $Aa$ to permit the flame to pass out of the hood into view. At the lower rim of the cylindrical skirt of the hood A between adjoining air inlet openings $Ab$ are a series of notches or slits $Ae$, parallel to the cylinder axis to render the skirt resilient enough to clamp onto the storm hood holder B and to be frictionally retained therein, when slipped into said holder.

The inlet openings $Ab$ for the combustion air in the hood A are located in a row near the bottom of the hood and are shown of rectangular elongated form and the flame outlet openings $Aa$ in this hood are located above the row of air inlet openings in staggered relationship therewith and are smaller in width at the bottom than at the top. In the specific form shown, these flame outlet openings $Aa$ are in the form of inverted triangles, with their apices at the bottom pointing downward. An odd number of these flame outlet openings $Aa$ is provided and since these are of equal size and shape and equally spaced, there are no two of these openings in diametrically opposite positions, thereby rendering the flame safer against extinguishment.

The wick and storm hood holder B serves to receive the wick in its passage from the reservoir to the hood A and to retain the hood A in operative position. This wick and hood holder B is made of metal in one piece and has a wick supply tube $Ba$ tapering downward and provided at its lower end with a sharply inturned peripheral edge $Be$ to prevent the wick, which is round and fills the opening defined by said edge snugly, from slipping downward in said tube. The upper end of the wick and hood holder B is bent to form a pair of annular arches or beads $Bb$ and $Bd$ separated by an annular channel $Bc$. The inner peripheral side of the outer arch or bead $Bd$ is substantially cylindrical and coincides substantially with the lower rim of the hood B to permit said rim to be frictionally retained against said peripheral side of the holder and the height of said outer bead is no greater than the height of the hood skirt up to the lower edges of the air inlet openings $Ab$ to prevent obstruction of air admission through said openings $Ab$. The top of the inner arch or bead $Bd$ does not rise above the lower edges of the air inlet openings Ab to prevent obstruction of air admission through said openings Ab.

Through the combination of the wick and storm hood holder B and the storm hood A and the design described above, uniform combustion of the evolved gases is ensured. In the event of inadequate supply of fresh air, due for example, to the calmness of the wind, the gases not burnt and the portions of the liquid fuel not evaporated, will collect as condensate in the annular channel Bc. Since the arriving current of cold combustion air is not sufficient thereafter to cool the storm hood holder B, this holder heated by conduction of heat causes the accumulated oil residue in the channel Bc to evaporate and thereby to burn. Consequently, both with heavy and light supply of fresh air, complete combustion is ensured and therefore more perfect utilization of the fuel is attained.

If the fuel reservoir used has neither a screw opening nor any other opening to serve for the reception of the burner or combustion unit, then the opener C may be used. This reservoir tank or can opener C consists of a conical metal tube running downward to a dovetailed knife tip for puncturing the top wall of this tank or can. The upper part of this opener C is provided with an annular bead Cb or arch terminating in a flat rim Cc to afford firm seating of the opener on the reservoir tank or can.

Figs. 7 and 8 show a modified form of combustion or burner unit which is similar to that of Figs. 1-6, except as will be indicated herein. In this modified form, the burner unit has a storm hood A' with combustion air inlet openings Ad along the bottom and an odd number of flame outlet openings Ac in staggered relationship therewith. The openings Ac are substantially rectangular except for rounded or semi-circular bottom edges.

The wick and storm hood holder B' has its upper part similar to that of the holder B in the form shown in Figs. 1, 3 and 4, but instead of being shaped for frictional attachment to a reservoir opening or to a reservoir opener, as in the form shown in Figs. 1, 3 and 4, has a threaded section B'a for threaded attachment to the reservoir opening, and a flange B'f for seating on the reservoir wall around said opening. The lower end of this wick and storm hood holder is turned sharply inwardly to form a lip to retain the wick against downward slippage.

In Figs. 9, 10 and 11 is shown a modified form of warning torch comprising a fuel reservoir D which is of semi-bulbous form, as for example, of semi-spherical or paraboloidal shape to impart to the torch great stability against overturning even when filled only slightly with fuel, and which because of its stream-lined contour affords slight air resistance, thereby adding to its stability.

The bottom of the fuel reservoir D is stamped or pressed to form a round central depression E and a recess F. The central depression E in one torch serves to receive the upper part of a torch below it, thereby permitting the torches to be nested and stacked one on top of the other, as shown, to house a lighter or matches for ignition of the wick. To seat the torches firmly in stacked relationship, the bottom of the fuel reservoir tank D around the depression E has an annular bead G adapted to seat in an annular recess H in the skirt of said tank.

The storm hood A" has an odd number of openings A"a tapering towards their lower ends to permit the flame to pass outwardly therefrom into view as in the forms of Figs. 1-6, but has no combustion air inlet openings, as in the forms of Figs. 1-6. This storm hood A" is screwed into or otherwise connected into a coupling ring I at the mouth of the fuel reservoir tank D, as for example, by a bayonet connection.

By providing a wind by-pass device J in the form of a storm collar around the storm hood A", there is formed between said storm collar and said hood an annular channel K through which the flame from the hood projects, and there is afforded for said flame a guard which in the face of a high constant wind, protects said flame against extinguishment. This protective storm collar J when the wind is calm serves to confine the flame and causes it to be longer and more uniform.

The storm collar J may be screwed onto the coupling ring I at the mouth of the fuel reservoir tank D or may be connected thereto in any other way, as for example, by means of a bayonet connection. At the lower part of the storm collar J, there is a crown of holes Ja to admit air for combustion, while the upper part is flared and fluted to form a series of lobes Jb, corresponding in number to the number of flame outlet openings A"a, five being shown, equally spaced. This storm collar J is swaged or pressed into the fluted or lobated form described, and as a result of this pressing operation, there are defined a number of radially inwardly depressed sections Jc coming up to a height just below the top of the flame outlets A"a and the lobes Jb coming up to a lesser height.

The rotative relative positions of the storm hood A" and the storm collar J are so set, that the inwardly depressed sections Jc of the storm hood J come opposite the flame outlets A"a respectively, while the lobes Jb at a greater radial distance from the hood are located directly opposite the imperforate sections Ad of storm hood A respectively, as shown in Fig. 10. By means of this arrangement, the flame outlet openings A"a are effectively protected against the full blast of the wind thereagainst and at the same time, there is produced an air swirl formation, which causes the flame to be pressed against the direction of the current of wind.

The extinguishment of the torch is brought about by a snuffer cap L adapted to be brought over the hood A". This cap L is provided with a thread and packing ring and is screwed on the tank coupling ring I which at the lower part carries the storm collar or guard J.

The side of the fuel reservoir tank D may have a fitting (not shown) attached thereto to receive the cap L when not in use. This fitting may be the same kind of connection as is provided around the burner unit to receive the cap L for flame extinguishment, and when the cap is attached to said fitting, it not only supports the cap against loss or misplacement but also permits said cap to be used as a handle for the torch.

The bottom of the fuel reservoir tank D, instead of being provided with depression E and recess F for the purposes indicated, may have a single central depression to house a box of matches, and a cover may be provided frictionally held in closure position across said depression and retained in said position against accidental removal by means of a bar across said cover and removably fitted into hooks secured to the bottom wall of said tank. This bar may serve not only for the purpose of retaining the cover in closed position, but may be shaped at one end to permit it to be used as a tool to pry the cover open.

The storm hood A" and the storm collar or guard J must be supported in predetermined rotative relationship as described. If these members have bayonet connections with the coupling ring I, the proper relative positioning of these members A" and J is assured.

What is claimed is:

1. A warning torch operated by liquid fuel, comprising a fuel reservoir tank having an opening through which a wick is adapted to extend from the interior of the tank, and a storm hood over said opening for housing the lighted end of the wick, said storm hood being in the form of an inverted cup having on its peripheral wall a number of flame outlet openings of equal size and shape equally spaced, the number of said openings being odd, whereby the presence of any two of such flame outlet openings in diametrical opposition is obviated.

2. A warning torch as described in claim 1, wherein each of said flame outlet openings tapers downward and said storm hood is free of combustion air inlets aside from said flame outlet openings.

3. A warning torch operated by liquid fuel, comprising a fuel reservoir tank having an opening through which a wick is adapted to extend from the interior of the tank, a storm hood over said opening for housing the lighted end of the wick, said storm hood being in the form of an inverted cup having on its peripheral wall a number of flame outlet openings distributed therearound, and a storm collar surrounding said hood and spaced radially therefrom to form an annular channel around said hood, the maximum diametrical width of said storm collar being substantially less than the maximum width of said tank and being small enough to cause said channel to confine the flame emitted from said flame outlet openings close to said storm hood and to elongate said flame.

4. A warning torch as described in claim 3, wherein said flame outlet openings are of equal size and shape, and are equally spaced around the peripheral wall of the storm hood, and the number of said flame outlet openings is odd, whereby the presence of any two of such flame outlet openings in diametrical opposition is obviated.

5. A warning torch as described in claim 3, wherein said storm collar has a series of openings around the region thereof near the base to admit air for combustion therethrough.

6. A warning torch as described in claim 3, wherein said storm collar is fluted to provide outwardly extending lobes disposed directly opposite the imperforate sections respectively of the hood between adjoining flame outlet openings, and intervening radially inwardly depressed sections located directly opposite the flame outlet openings respectively.

7. A warning torch as described in claim 6, comprising a bayonet connection between said storm hood and said tank, and a bayonet connection between said storm collar and said tank, whereby the relative rotative positions of said hood and said collar are predetermined.

8. A warning torch as described in claim 3, wherein said storm collar is fluted to provide outwardly extending lobes disposed directly opposite the imperforate sections respectively of the hood between adjoining flame outlet openings, and intervening radially inwardly depressed sections opposite the flame outlet openings respectively, and wherein said storm collar has a series of openings around the region thereof near the base to admit air therethrough for combustion.

9. A warning torch operated by liquid fuel, comprising a fuel reservoir tank having a top opening through which a wick is adapted to extend from the interior of the tank, a storm hood over said opening for housing the lighted end of the wick, said storm hood being in the form of an inverted cup having on its peripheral wall a number of flame outlet openings of equal size and shape equally spaced, the number of said flame outlet openings being odd, whereby the presence of any two of said flame outlet openings in diametrical opposition is obviated, a storm collar surrounding said storm hood and radially spaced therefrom to form an annular channel around said hood, the maximum diametrical width of said storm collar being substantially less than the maximum width of said tank and being small enough to cause said channel to confine the flame emitted from said flame outlet openings close to said storm hood and to elongate said flame, said storm collar being fluted to provide outwardly extending lobes located directly opposite the imperforate sections respectively of the hood between adjoining flame outlet openings and intervening radially inwardly depressed sections located directly opposite the flame outlet openings respectively, and said storm collar having a series of openings around the region thereof near the base to admit air for combustion therethrough.

10. A warning torch as described in claim 9, wherein the flame outlet openings taper downward and said storm hood is free of combustion air inlets aside from said flame outlet openings.

References Cited in the file of this patent

UNITED STATES PATENTS

| | | |
|---|---|---|
| 1,732,708 | Withrow | Oct. 22, 1929 |
| 2,079,170 | Horsley | May 4, 1937 |
| 2,120,255 | McCloskey | June 14, 1938 |
| 2,121,903 | Currie | June 28, 1938 |
| 2,121,904 | Currie | June 28, 1938 |
| 2,132,004 | Kovac | Oct. 4, 1938 |
| 2,441,242 | Harkins | May 11, 1948 |